US012154782B2

(12) United States Patent
Horibe

(10) Patent No.: US 12,154,782 B2
(45) Date of Patent: Nov. 26, 2024

(54) EXCIMER LAMP AND EXCIMER LAMP DEVICE

(71) Applicant: Ushio Denki Kabushiki Kaisha, Tokyo (JP)

(72) Inventor: Hiroki Horibe, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/571,288

(22) PCT Filed: Mar. 22, 2022

(86) PCT No.: PCT/JP2022/013025
§ 371 (c)(1),
(2) Date: Dec. 18, 2023

(87) PCT Pub. No.: WO2022/270062
PCT Pub. Date: Dec. 29, 2022

(65) Prior Publication Data

US 2024/0290606 A1 Aug. 29, 2024

(30) Foreign Application Priority Data

Jun. 21, 2021 (JP) ................................ 2021-102177

(51) Int. Cl.
*H01J 61/54* (2006.01)
*H01J 61/30* (2006.01)
(Continued)

(52) U.S. Cl.
CPC .......... *H01J 61/545* (2013.01); *H01J 61/305* (2013.01); *H01J 65/046* (2013.01); *H05B 41/38* (2013.01); *H05B 47/16* (2020.01)

(58) Field of Classification Search
CPC .............................. H01J 61/545; H01J 61/305
(Continued)

(56) References Cited

U.S. PATENT DOCUMENTS

2014/0239804 A1* 8/2014 Kelly .................... H01J 61/305 313/631
2014/0327996 A1* 11/2014 Westebbe .................. H01T 4/16 361/120
2017/0148623 A1* 5/2017 Kitagawa ............. H01J 61/305

FOREIGN PATENT DOCUMENTS

EP 3882953 A1 9/2021
JP H11-273629 A 10/1999
(Continued)

OTHER PUBLICATIONS

International Search Report issued in PCT/JP2022/013025; mailed May 17, 2022.

(Continued)

*Primary Examiner* — Christopher M Raabe
(74) *Attorney, Agent, or Firm* — Studebaker & Brackett PC

(57) ABSTRACT

The excimer lamp includes: a discharge container having a substantially quadrangular shape with a cross section, the discharge container having a pair of flat walls extending in a longitudinal direction and a pair of side walls connecting the flat walls; a pair of external electrodes facing each other disposed on outer surfaces of the pair of flat walls, respectively; a first internal electrode disposed inside the discharge container so as to extend toward inner surfaces of the pair of flat walls; and a second internal electrode disposed inside the discharge container at a position spaced apart from the first internal electrode in the longitudinal direction so as to extend toward the inner surfaces of the pair of flat walls. The first internal electrode and the second internal electrode are respectively disposed at positions between end parts and central parts of the external electrodes in the longitudinal direction.

15 Claims, 18 Drawing Sheets

(51) Int. Cl.

| | |
|---|---|
| ***H01J 65/04*** | (2006.01) |
| ***H05B 41/38*** | (2006.01) |
| ***H05B 47/16*** | (2020.01) |

(58) Field of Classification Search
USPC .......................................................... 313/581
See application file for complete search history.

(56) References Cited

FOREIGN PATENT DOCUMENTS

| | | | |
|---|---|---|---|
| JP | 2000-77033 | A | 3/2000 |
| JP | 2008-34272 | A | 2/2008 |
| JP | 2008-135194 | A | 6/2008 |
| JP | 2012-176341 | A | 9/2012 |
| JP | 5376410 | B2 | 12/2013 |
| WO | 2020/100733 | A1 | 5/2020 |

OTHER PUBLICATIONS

Notification of Transmittal of Translation of the International Preliminary Report on Patentability and.Translation of Written Opinion of the International Searching Authority; PCT/JP2022/013025; mailed on Jan. 4, 2024.

The partial supplementary European search report (R. 164 EPC) issued by the European Patent Office on Sep. 13, 2024, which corresponds to European Patent Application No. 22827982.4-1211 and is related to U.S. Appl. No. 18/571,288.

* cited by examiner

EXCIMER LAMP AND EXCIMER LAMP DEVICE

TECHNICAL FIELD

The present invention relates to an excimer lamp and an excimer lamp device.

BACKGROUND ART

Recently, excimer lamps (hereinafter also simply referred to as lamp) have been used for the purpose of irradiating a surface of a film, a building material (including an infrastructure member) or the like with ultraviolet rays to modify the surface, and accordingly, various levels of light emission have been required in accordance with applications or processes.

Conventionally, an excimer lamp is used in such a way that the level of light emission is changed by dimming, and frequency dimming is widely used as a dimming method. The frequency dimming is a method for controlling an output by adjusting the number of pulses of light emitted from the lamp by changing the frequency of applied power. In this method, the lamp is turned on by controlling an input with the voltage to be applied being fixed to an optimum value. Thus, this method has an advantage that the startup performance can be favorably maintained even if the input is lowered, but has a problem that the dimming range is limited since lighting and discharging cannot be partially maintained if the dimming level is excessively lowered. In addition, recently, the length of the excimer lamp has been increased, and a long lamp exceeding 3 m has been developed, while the problem of frequency dimming becomes more prominent as the length of the lamp has been increased.

As another dimming method, there is a means called duty dimming. The duty dimming is a method for generating an On-time and an Off-time of light emission by repeating a duty-On time and a duty-Off time at a frequency at which a lamp is stably discharged (at which the lamp is turned on), and adjusting an output in a unit time. Unlike the frequency dimming, the duty dimming allows the lamp to operate at a stable frequency, and thus, can control light up to a considerably lower level.

As still another dimming means, there is a means called voltage dimming. The voltage dimming is a method for adjusting power to a lamp by increasing or decreasing a voltage at a frequency at which the lamp is stably discharged (the lamp is turned on). Similar to the duty dimming, the voltage dimming allows the lamp to operate at a stable frequency, and thus, can control light up to a lower level.

However, the duty dimming repeats the duty-On time and the duty-Off time, and starts the lamp every duty-On time. Therefore, the duty dimming is greatly affected by the startup performance of the lamp. Commonly, the excimer lamp is provided with a start assist electrode at one end part in the longitudinal direction, and an electric discharge is started therefrom (for example, Patent Document 1). When the Off-time in one cycle is increased in order to lower the level of light emission, a time lag from the start of the electric discharge on the start assist electrode side until the electric discharge propagates to the other end part occurs. The duty dimming is a method for starting the lamp many times within a unit time, and thus causes a difference in quantity of light according to the ON/OFF cycle and the startup delay, resulting in non-uniform illuminance in the longitudinal direction of the lamp. In addition, the duty dimming also has a problem that the non-uniform illuminance becomes more prominent because of an increase in startup delay with an increase in length of the lamp.

PRIOR ART DOCUMENT

Patent Document

Patent Document 1: JP-B2-5376410

SUMMARY OF THE INVENTION

Problems to be Solved by the Invention

In view of the above problems, an object of the present invention is to provide an excimer lamp and an excimer lamp device that have uniform illuminance on an emission surface in the longitudinal direction of the excimer lamp, even if the excimer lamp is elongated.

Means for Solving the Problems

An excimer lamp according to the present invention includes:

- a discharge container having a substantially quadrangular shape with a cross section, the discharge container having a pair of flat walls extending in a longitudinal direction and a pair of side walls connecting the flat walls;
- a pair of external electrodes facing each other disposed on outer surfaces of the pair of flat walls, respectively;
- a first internal electrode disposed inside the discharge container so as to extend toward inner surfaces of the pair of flat walls; and
- a second internal electrode disposed inside the discharge container at a position spaced apart from the first internal electrode in the longitudinal direction so as to extend toward the inner surfaces of the pair of flat walls,
- wherein the first internal electrode and the second internal electrode are respectively disposed at positions between end parts and central parts of the external electrodes in the longitudinal direction.

With this configuration, the first internal electrode and the second internal electrode are respectively disposed at positions between the end parts and the central parts of the external electrodes in the longitudinal direction, whereby an electric discharge starts from the positions of the first internal electrode and the second internal electrode. Thus, a time for the electric discharge to diffuse to the entire region of the discharge container can be reduced. As a result, even when the excimer lamp which is long performs, for example, duty dimming, the illuminance on the emission surface of the excimer lamp in the longitudinal direction can be made uniform.

In the excimer lamp according to the present invention, the first internal electrode may be disposed so as to connect the inner surfaces of the pair of flat walls, and the second internal electrode may be disposed so as to connect the inner surfaces of the pair of flat walls.

With this configuration, the first internal electrode and the second internal electrode can be easily installed inside the discharge container.

In the excimer lamp according to the present invention, the first internal electrode and the second internal electrode may be disposed along inner surfaces of the side walls.

With this configuration, the first internal electrode and the second internal electrode can be easily installed inside the discharge container.

In the excimer lamp according to the present invention, at least a part of the first internal electrode or the second internal electrode may face at least one of the pair of external electrodes across the flat walls.

Since the first internal electrode and the second internal electrode face the pair of external electrodes across the flat walls, an electric discharge can be reliably started from the vicinity of the first internal electrode and the second internal electrode.

In the excimer lamp according to the present invention, the first internal electrode and the second internal electrode may not face both of the pair of external electrodes across the flat walls.

Even when the first internal electrode and the second internal electrode do not face both of the pair of external electrodes across the flat walls, an electric discharge can be started from the vicinity of the first internal electrode and the second internal electrode.

The excimer lamp according to the present invention may further include a third internal electrode inside the discharge container, the third internal electrode being disposed at a position between the first internal electrode and the second internal electrode in the longitudinal direction so as to extend toward the inner surfaces of the pair of flat walls.

This configuration can further reduce the time for the electric discharge to diffuse to the entire region of the discharge container.

In the excimer lamp according to the present invention, the third internal electrode may be disposed to connect the inner surfaces of the pair of flat walls.

With this configuration, the third internal electrode can be easily installed inside the discharge container.

In the excimer lamp according to the present invention, the first internal electrode and the second internal electrode may be respectively disposed at positions of end parts of the external electrodes in the longitudinal direction.

With this configuration, the electric discharge having started at the positions of both end parts of the external electrodes in the longitudinal direction propagates toward the central parts, and thus, the time for the electric discharge to diffuse to the entire region of the discharge container can be reduced.

In the excimer lamp according to the present invention, n internal electrodes including the first internal electrode and the second internal electrode may be each disposed at a central position of a region obtained by dividing the external electrodes into n equal parts in the longitudinal direction.

With this configuration, the electric discharge having started from the n internal electrodes diffuses in each of n equal discharge spaces, and thus, the time for the electric discharge to diffuse to the entire region of the discharge container can be reduced.

In addition, an excimer lamp device according to the present invention includes: any of the excimer lamps described above; and a lighting device for lighting the excimer lamp, wherein the lighting device includes a dimming means for dimming the excimer lamp.

With this configuration, the illuminance on an emission surface of the excimer lamp in the longitudinal direction is uniform, even if the excimer lamp is elongated.

In the excimer lamp device according to the present invention, the dimming means may include a duty control unit that changes a time ratio between an On-time and an Off-time of the excimer lamp.

In the excimer lamp device according to the present invention, the dimming means may include a frequency control unit that changes a lighting frequency of the excimer lamp.

In the excimer lamp device according to the present invention, the dimming means may include a voltage control unit that changes a lighting voltage of the excimer lamp.

MODE FOR CARRYING OUT THE INVENTION

Figure 1:
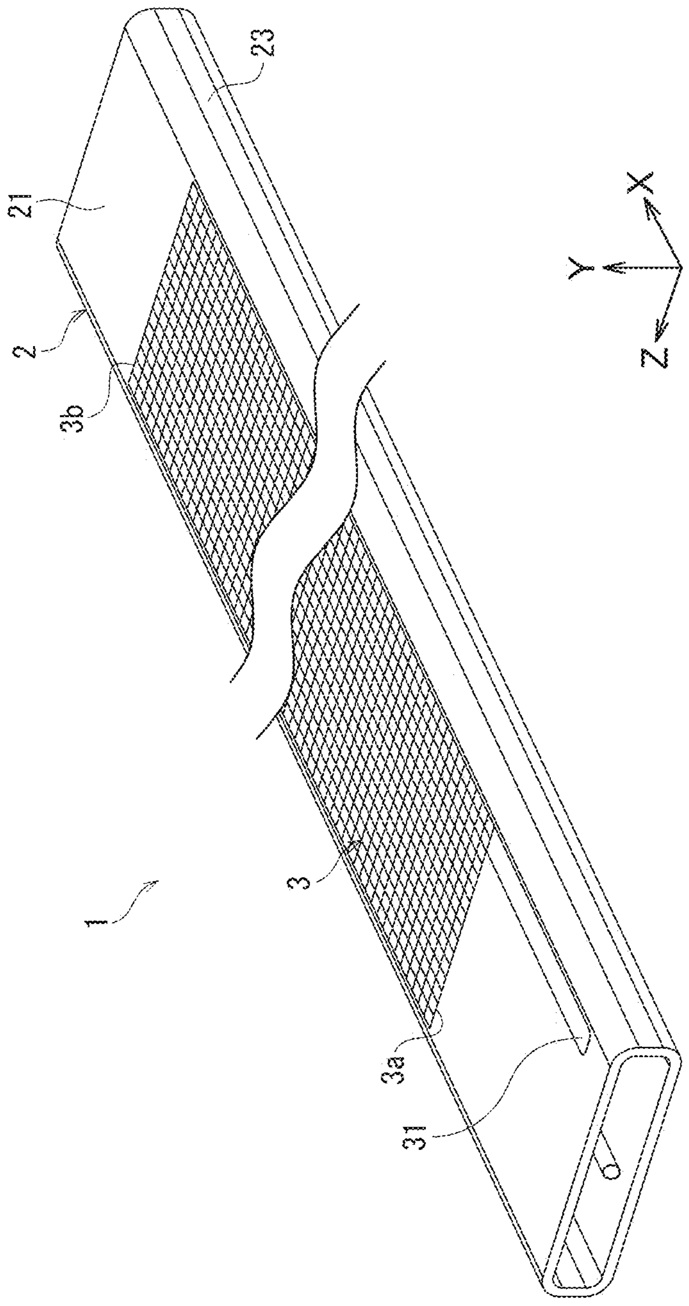
FIG. 1 is a perspective view of an excimer lamp according to a first embodiment.

Embodiments of an excimer lamp and an excimer lamp device according to the present invention will be described with reference to the drawings. Note that the following drawings are schematically illustrated, the dimensional ratios in the drawings do not necessarily coincide with the actual dimension ratios, and the dimensional ratios do not necessarily coincide between the drawings.

First Embodiment

Figure 2A:
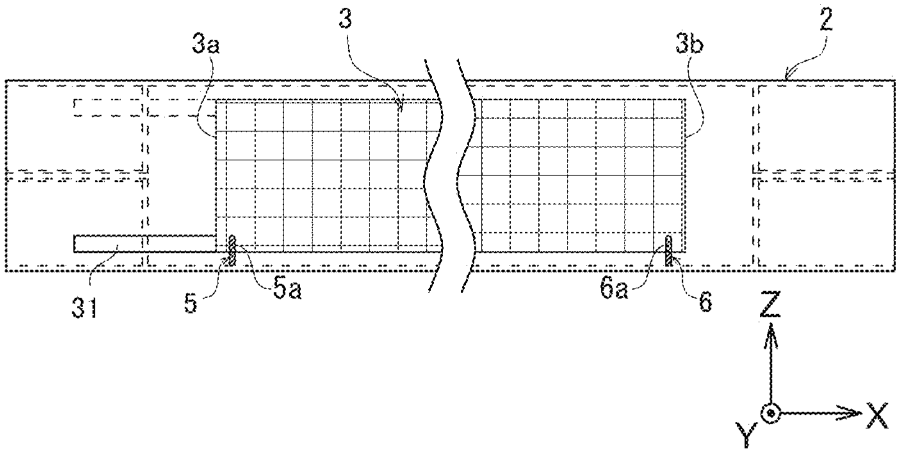
FIG. 2A is a plan view of the excimer lamp according to the first embodiment.
Figure 2B:
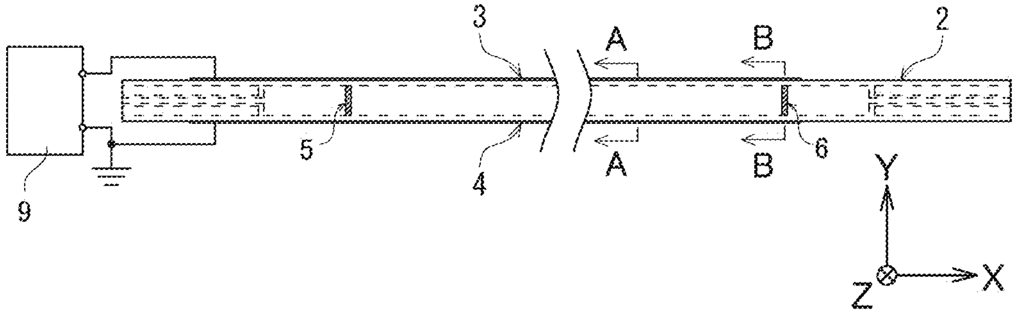
FIG. 2B is a front view of the excimer lamp according to the first embodiment.
Figure 2C:
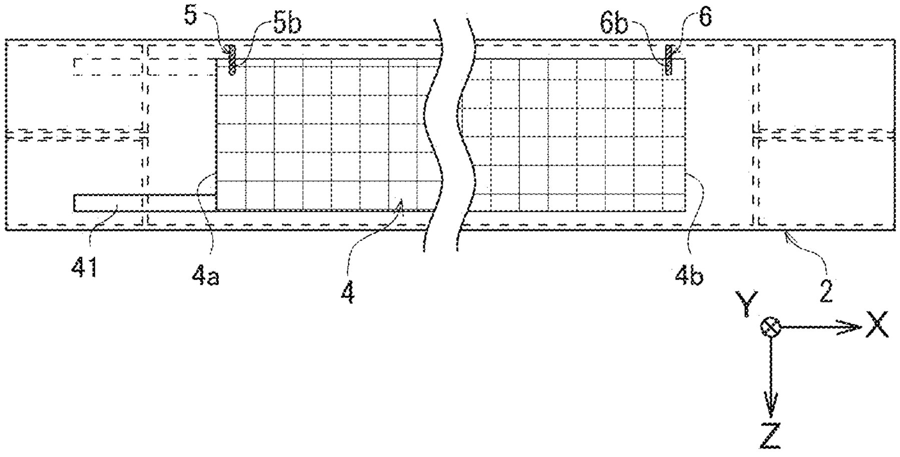
FIG. 2C is a bottom view of the excimer lamp according to the first embodiment.

FIG. 1 is a perspective view of an excimer lamp according to a first embodiment. FIGS. 2A to 2C are diagrams of the excimer lamp illustrated in FIG. 1 as viewed from three directions, in which FIG. 2A is a plan view, FIG. 2B is a front view, and FIG. 2C is a bottom view. In the following description, a direction (longitudinal direction) in which an excimer lamp 1 extends is defined as an X direction, a direction in which external electrodes 3 and 4 (to be described in detail later) of the excimer lamp 1 face each other is defined as a Y direction, and a direction orthogonal to the X direction and the Y direction is defined as a Z direction, as illustrated in FIG. 1. Furthermore, positive and negative orientations distinguished from each other for directional expression will be described as a "+X direction" and a "−X direction" by adding positive and negative signs, while a direction expressed without distinction between positive and negative orientations will be described simply as the "X direction".

Figure 3:
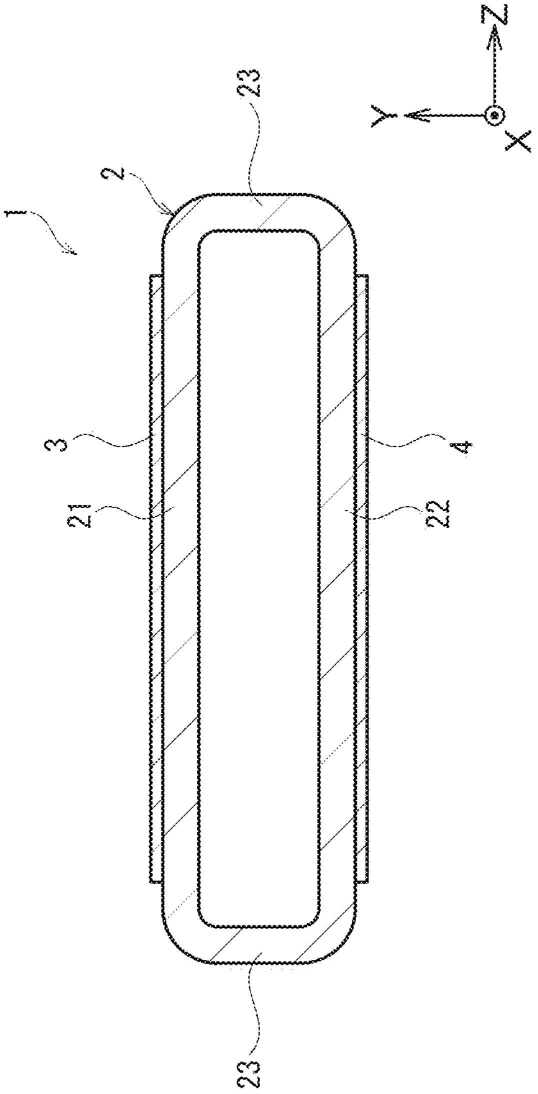
FIG. 3 is a cross-sectional view taken along line A-A of the excimer lamp illustrated in FIG. 2B.

FIG. 3 is a cross-sectional view taken along line A-A of the excimer lamp 1 illustrated in FIG. 2B. The excimer lamp 1 includes a discharge container 2. The discharge container 2 is formed of a dielectric material (for example, quartz glass) having transparency to ultraviolet rays. The discharge container 2 has a substantially quadrangular shape with a cross section, and has a pair of flat walls 21 and 22 and a pair of side walls 23 and 23. The discharge container 2 is elongated in the X direction, and has a length of 600 mm or more. The discharge container 2 having a length of 600 mm or more is likely to have less uniformity of illuminance due to the above-described startup delay.

A discharge gas that generates excimer molecules by an electric discharge is sealed in the discharge container 2. In the present embodiment, the discharge gas contains xenon (Xe). A more specific example of the discharge gas is a gas mixture containing xenon (Xe) and neon (Ne) in a predetermined ratio, and the gas mixture may or may not further include a small amount of oxygen or hydrogen.

A pair of external electrodes 3 and 4 facing each other is provided on outer surfaces of the pair of flat walls 21 and 22 of the discharge container 2. The external electrode 3 provided on the outer surface of the flat wall 21 is, for example, a high-voltage supply electrode (high-voltage-side electrode), and the external electrode 4 provided on the outer surface of the flat wall 22 is, for example, a ground electrode (low-voltage-side electrode). At least one of the external electrode 3 and the external electrode 4 is a light-transmissive electrode. Each of the external electrodes 3 and 4 in the present embodiment has a mesh shape, and light passes through the mesh.

A power supply unit 31 extending along the X direction is provided at a −X-direction end 3*a* of the external electrode 3. Similarly, a power supply unit 41 extending along the X direction is provided at a −X-direction end 4*a* of the external electrode 4. The power supply unit 31 and the power supply unit 41 are connected to a lighting device 9 (see FIG. 2B).

Although both of the pair of external electrodes 3 and 4 are light-transmissive electrodes, they are not limited thereto, and for example, either of the external electrode 3 or 4 may be a solid electrode. In addition, the external electrodes 3 and 4 may have any shape as long as they can transmit light. For example, the external electrodes 3 and 4 may have slits.

In addition, the external electrodes 3 and 4 in the present embodiment are both formed of the same material, and printed by screen printing and fired on the outer surface of the discharge container 2, but may be formed of different materials by different methods. In addition, as the material for forming the external electrodes 3 and 4, gold, platinum, or the like, an alloy containing the above metals, or the like can be adopted, for example.

Figure 4:
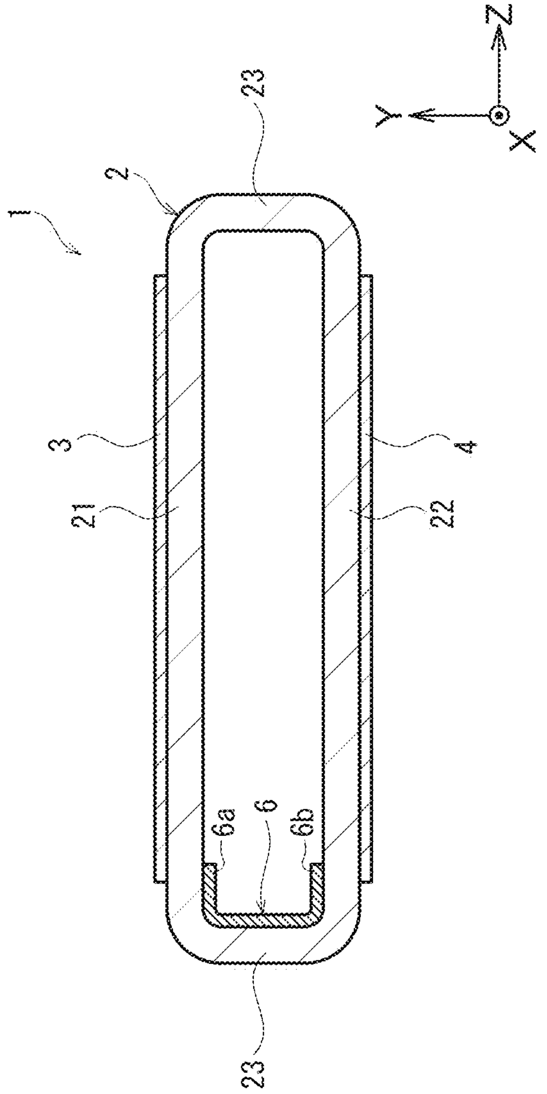
FIG. 4 is a cross-sectional view taken along line B-B of the excimer lamp illustrated in FIG. 2B.

FIG. 4 is a cross-sectional view taken along line B-B of the excimer lamp 1 illustrated in FIG. 2B. Inside the discharge container 2, a first internal electrode 5 and a second internal electrode 6 are provided at positions spaced apart in the longitudinal direction. The first internal electrode 5 and the second internal electrode 6 are disposed inside the discharge container 2 so as to extend toward the inner surfaces of the pair of flat walls 21 and 22. In the present embodiment, the first internal electrode 5 and the second internal electrode 6 are disposed so as to connect the inner surfaces of the pair of flat walls 21 and 22 along the inner surfaces of the side walls 23 of the discharge container 2.

The material for forming the internal electrodes 5 and 6 is, for example, platinum. The internal electrodes 5 and 6 are formed by applying a paste material to the inner surface of the discharge container 2 and then firing the paste material. The widths of the internal electrodes 5 and 6 in the X direction are, for example, 1 mm to 5 mm.

The first internal electrode 5 and the second internal electrode 6 are respectively disposed at positions between end parts and central parts of the external electrodes 3 and 4 in the longitudinal direction. In the present embodiment, the first internal electrode 5 and the second internal electrode 6 are respectively disposed at positions of end parts of the external electrodes 3 and 4 in the longitudinal direction. In the present specification, the "end part" of the external electrode 3 in the longitudinal direction includes a region within 30 mm in the +X direction from the X-direction ends 3*a* and 3*b* of the external electrode 3. Similarly, the "end part" of the external electrode 4 in the longitudinal direction includes a region within 30 mm in the +X direction from the X-direction ends 4*a* and 4*b* of the external electrode 4.

In the present embodiment, the first internal electrode 5 is disposed slightly inside (+X side) the −X-direction ends 3*a* and 4*a* of the external electrodes 3 and 4 as illustrated in FIGS. 2A to 2C. Similarly, the second internal electrode 6 is disposed slightly inside (−X side) the +X-direction ends 3_b_ and 4_b_ of the external electrodes 3 and 4. Note that the distance in the X direction between the first internal electrode 5 and the −X-direction ends 3_a_ and 4_a_ of the external electrodes 3 and 4 is 30 mm or less, and thus, it can be said that the first internal electrode 5 is disposed at the positions of the end parts of the external electrodes 3 and 4 in the longitudinal direction as described above. Similarly, the distance in the X direction between the second internal electrode 6 and the +X-direction ends 3_b_ and 4_b_ of the external electrodes 3 and 4 is 30 mm or less, and thus, it can be said that the second internal electrode 6 is disposed at the positions of the end parts of the external electrodes 3 and 4 in the longitudinal direction as described above.

In general, upon the start of a lamp, the dielectric breakdown voltage decreases in the vicinity of an internal electrode, and an electric discharge starts from the vicinity of the internal electrode. Thereafter, the electric discharge diffuses in the discharge container 2 in a chain reaction, and thus, a delay, which is a very short time, in startup start time occurs at a position away from the internal electrode. The delay in the startup start time is approximately proportional to the distance from the internal electrode. Therefore, when the excimer lamp 1 having the long discharge container 2 is provided with only one internal electrode at one end in the longitudinal direction of the external electrode, the problem of the delay in startup start time becomes prominent. When the first internal electrode 5 and the second internal electrode 6 are disposed respectively at positions between the end parts and the central parts of the external electrodes 3 and 4 in the longitudinal direction as in the present invention, an electric discharge starts from the positions of the first internal electrode 5 and the second internal electrode 6, so that a time for the electric discharge to diffuse to the entire region of the discharge container 2 can be reduced. As a result, even when the long excimer lamp 1 performs, for example, duty dimming in which on/off is repeated, the illuminance on the emission surface of the excimer lamp 1 in the longitudinal direction can be made uniform.

It is preferable that at least a part of the first internal electrode 5 or the second internal electrode 6 faces at least one of the pair of external electrodes 3 and 4 across the flat walls 21 and 22. Since the internal electrodes 5 and 6 face the external electrodes 3 and 4 across the flat walls 21 and 22, an electric discharge can be reliably started from the vicinity of the first internal electrode 5 and the second internal electrode 6.

In the present embodiment, as illustrated in FIG. 4, both ends 6_a_ and 6_b_ of the second internal electrode 6 extending along the inner surfaces of the flat walls 21 and 22 face the pair of external electrodes 3 and 4 across the flat walls 21 and 22, respectively. Similarly, as illustrated in FIGS. 2A to 2C, both ends 5_a_ and 5_b_ of the first internal electrode 5 extending along the inner surfaces of the flat walls 21 and 22 face the pair of external electrodes 3 and 4 across the flat walls 21 and 22, respectively.

An excimer lamp device includes the excimer lamp 1 and a lighting device 9 for lighting the excimer lamp 1. The lighting device 9 includes a dimming means for dimming the excimer lamp 1. Examples of the method for dimming the excimer lamp 1 include duty dimming and frequency dimming. The dimming means may include a duty control unit that changes the time ratio between an On-time and an Off-time of the excimer lamp 1. Alternatively, the dimming means may include a frequency control unit that changes the lighting frequency of the excimer lamp 1.

Figure 5A:
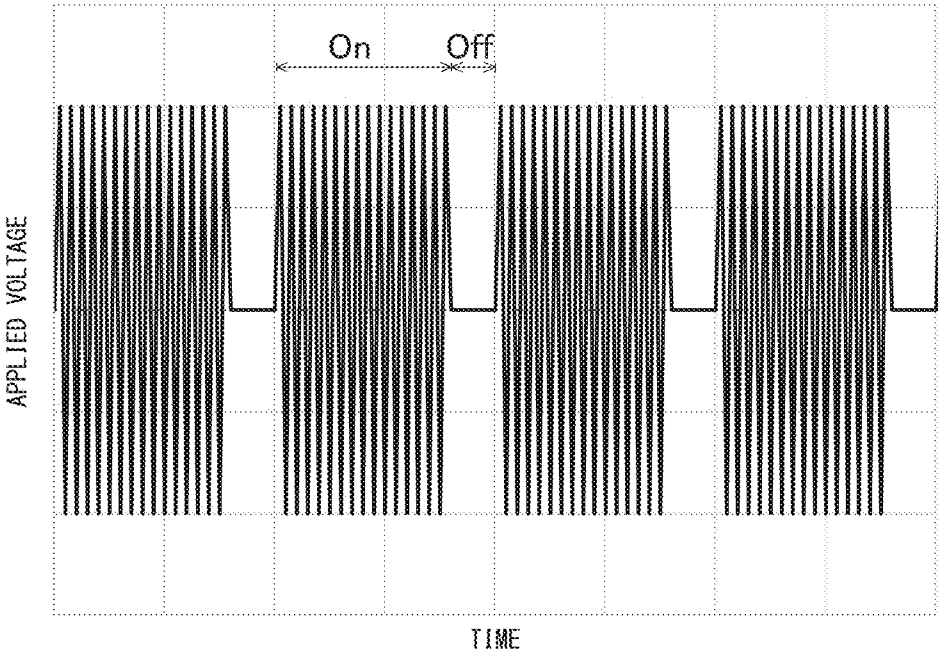
FIG. 5A is a diagram illustrating an example of the waveform of a voltage applied to a lamp in duty dimming.

The duty dimming is a dimming method for controlling an input to the lamp by discontinuously supplying power (by providing an On-time and an Off-time) with the voltage and the frequency being constant. FIG. 5A is a diagram illustrating an example of the waveform of a voltage applied to the lamp in duty dimming. FIG. 5A is a diagram for describing the duty ratio, and does not illustrate values of the applied voltage on the vertical axis and values of time on the horizontal axis. The duty ratio (%) is obtained by the following expression.

$$\text{Duty ratio (\%)}=\text{On time}/(\text{On time}+\text{Off time})\times 100$$

Figure 5B:
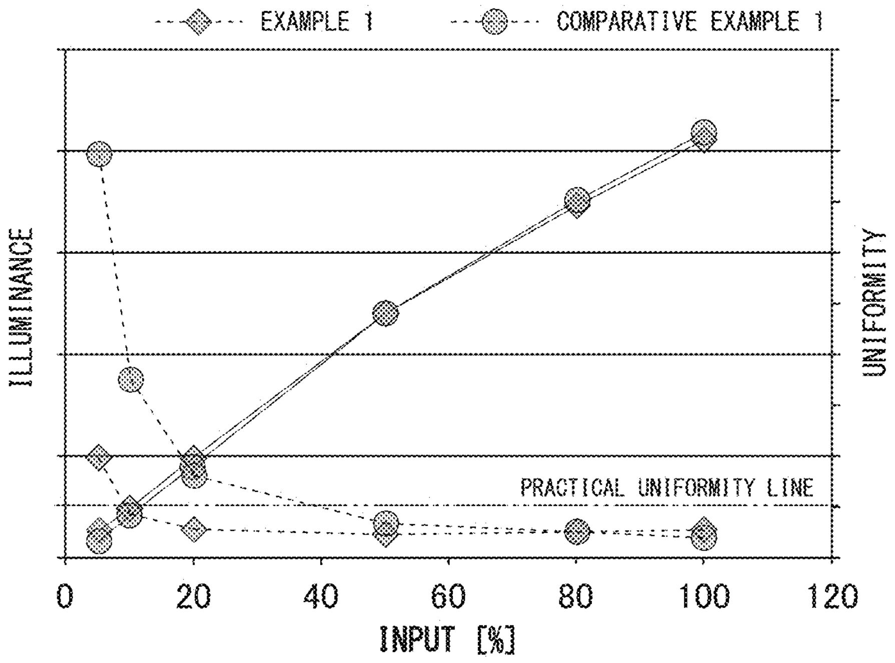
FIG. 5B is a graph showing an experimental result by duty dimming.

FIG. 5B is a graph showing an experimental result by duty dimming. A solid line in FIG. 5B indicates illuminance, and a broken line indicates the uniformity of the illuminance. The excimer lamp 1 illustrated in FIGS. 2A to 2C is defined as Example 1. A lamp provided with only the internal electrode 6 out of the internal electrodes 5 and 6 of the excimer lamp 1 illustrated in FIGS. 2A to 2C is defined as Comparative Example 1. As shown in FIG. 5B, in Comparative Example 1, the illuminance can be adjusted (dimming can be performed) by adjusting the duty ratio, but when the duty ratio is 40% or less, the uniformity exceeds a practical line (indicated by a dash-dot-dot line), and the illuminance becomes non-uniform. On the other hand, in Example 1, light can be controlled in a wide range where the duty ratio is 10% to 100% with the uniformity not exceeding the practical line.

Figure 6A:
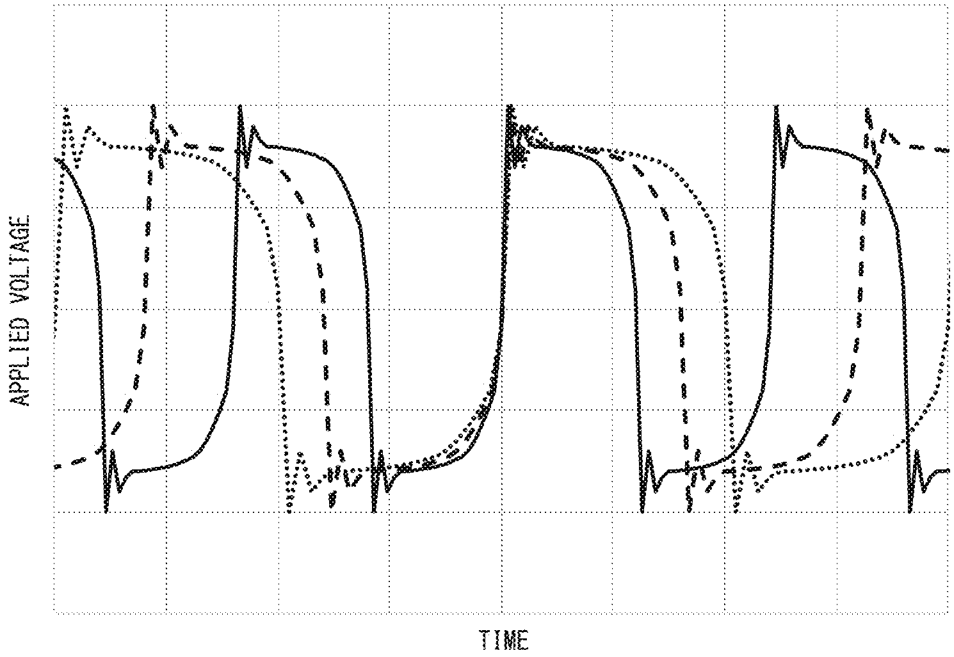
FIG. 6A is a diagram illustrating an example of the waveform of a voltage applied to the lamp in frequency dimming.

The frequency dimming is a dimming method for controlling an input to the lamp by increasing or decreasing the frequency of power to be applied to adjust the number of pulses in a unit time. FIG. 6A is a diagram illustrating an example of the waveform of a voltage applied to the lamp in frequency dimming. FIG. 6A is a diagram for describing an example of an increase and decrease of frequency, and does not illustrate values of the applied voltage on the vertical axis and values of time on the horizontal axis.

Figure 6B:
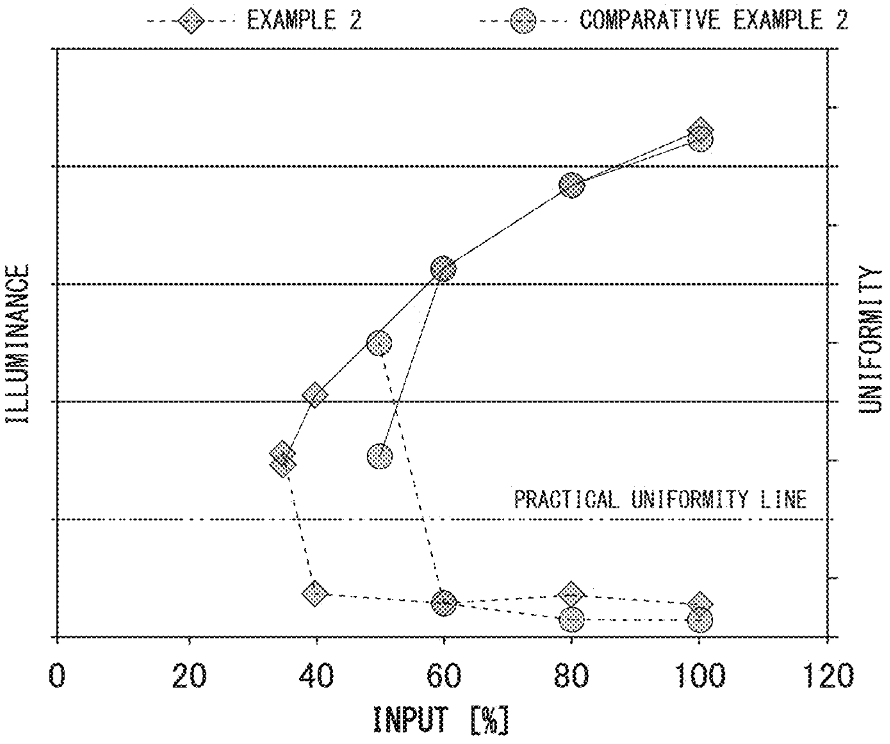
FIG. 6B is a graph showing an experimental result by frequency dimming.

FIG. 6B is a graph showing an experimental result by frequency dimming. A solid line in FIG. 6B indicates illuminance, and a broken line indicates uniformity. The excimer lamp 1 illustrated in FIGS. 2A to 2C is defined as Example 2. A lamp provided with only the internal electrode 6 out of the internal electrodes 5 and 6 of the excimer lamp 1 illustrated in FIGS. 2A to 2C is defined as Comparative Example 2. As shown in FIG. 6B, in Comparative Example 2, the illuminance can be adjusted (dimming can be performed) by adjusting power by frequency, but when the power is 50% or less, the uniformity exceeds a practical line (indicated by a dash-dot-dot line), and the illuminance becomes non-uniform. On the other hand, in Example 2, light can be controlled in a wide range where the power is 40% to 100% with the uniformity not exceeding the practical line.

Figure 7A:
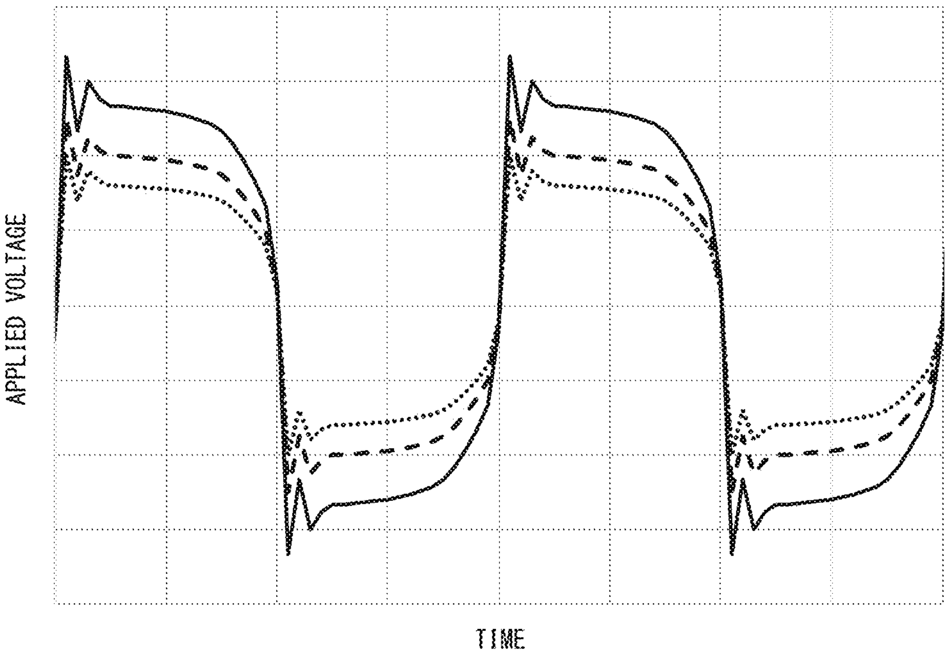
FIG. 7A is a diagram illustrating an example of the waveform of a voltage applied to the lamp in voltage dimming.

The voltage dimming is a method for controlling an input to the lamp by increasing or decreasing the voltage to be applied. In the frequency dimming, the number of pulses is adjusted, whereas in the voltage dimming, the pulse intensity is adjusted. FIG. 7A is a diagram illustrating an example of the waveform of a voltage applied to the lamp in voltage dimming. FIG. 7A is a diagram for describing an example of an increase and decrease of voltage, and does not illustrate values of the applied voltage on the vertical axis and values of time on the horizontal axis.

Figure 7B:
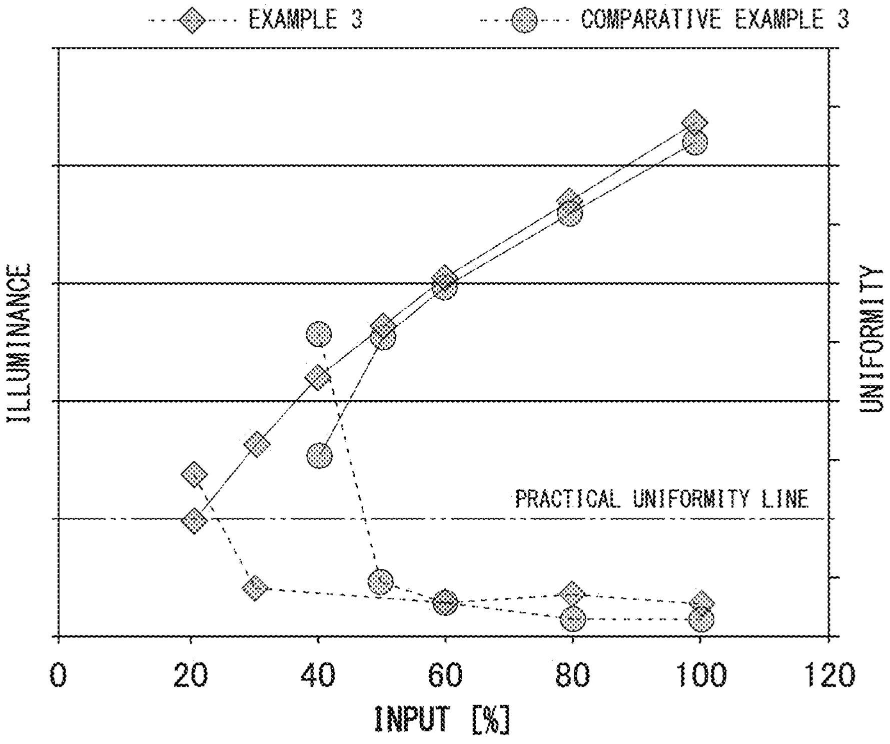
FIG. 7B is a graph showing an experimental result by voltage dimming.

FIG. 7B is a graph showing an experimental result by voltage dimming. A solid line in FIG. 7B indicates illuminance, and a broken line indicates uniformity. The excimer lamp 1 illustrated in FIGS. 2A to 2C is defined as Example 3. A lamp provided with only the internal electrode 6 out of the internal electrodes 5 and 6 of the excimer lamp 1 illustrated in FIGS. 2A to 2C is defined as Comparative Example 3. As shown in FIG. 7B, in Comparative Example 3, the illuminance can be adjusted (dimming can be performed) by adjusting power by voltage, but when the power is 40% or less, the uniformity exceeds a practical line (indicated by a dash-dot-dot line), and the illuminance becomes non-uniform. On the other hand, in Example 3, light can be controlled in a wide range where the power is 30% to 100% with the uniformity not exceeding the practical line.

Second Embodiment

Figure 8A:
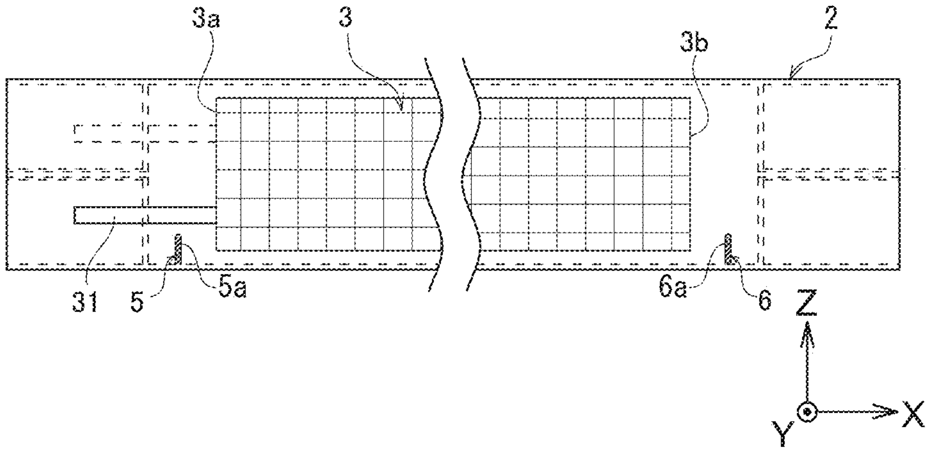
FIG. 8A is a plan view of an excimer lamp according to a second embodiment.
Figure 8B:
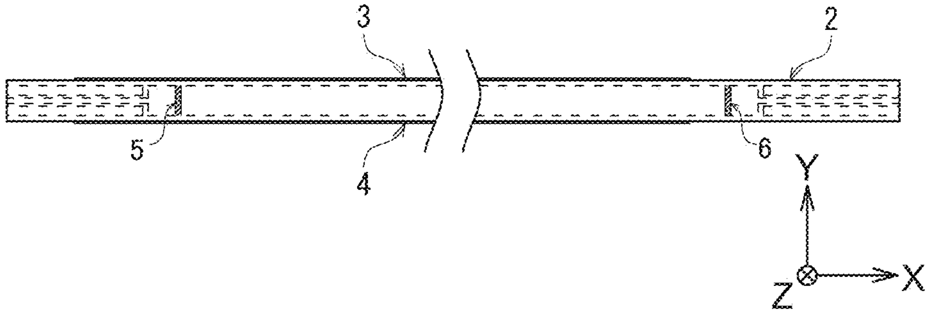
FIG. 8B is a front view of the excimer lamp according to the second embodiment.
Figure 8C:
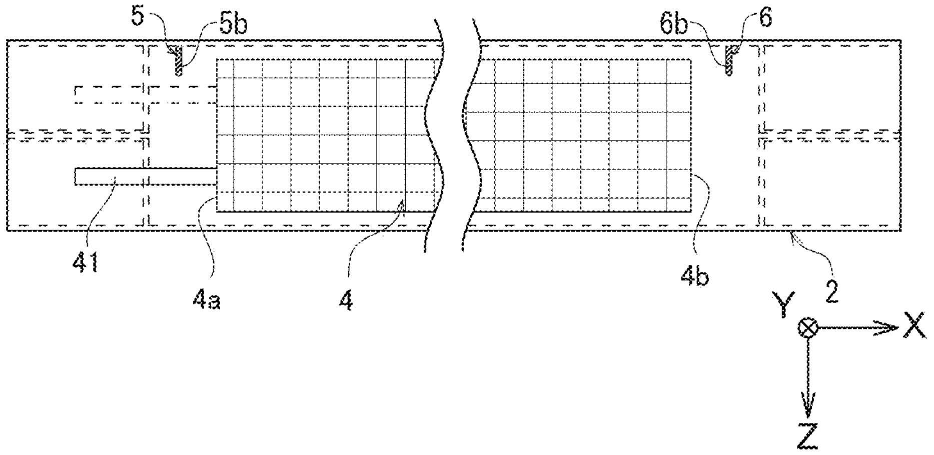
FIG. 8C is a bottom view of the excimer lamp according to the second embodiment.

FIGS. 8A to 8C are diagrams of an excimer lamp according to a second embodiment as viewed from three directions, in which FIG. 8A is a plan view, FIG. 8B is a front view, and FIG. 8C is a bottom view.

In the second embodiment, a first internal electrode 5 is disposed slightly outside (−X side) −X-direction ends 3*a* and 4*a* of external electrodes 3 and 4 as illustrated in FIGS. 8A to 8C. Similarly, a second internal electrode 6 is disposed slightly outside (+X side)+X-direction ends 3*b* and 4*b* of the external electrodes 3 and 4. Note that the distance in the X direction between the first internal electrode 5 and the −X-direction ends 3*a* and 4*a* of the external electrodes 3 and 4 is 30 mm or less, and thus, it can be said that the first internal electrode 5 is disposed at the positions of end parts of the external electrodes 3 and 4 in the longitudinal direction. Similarly, the distance in the X direction between the second internal electrode 6 and the +X-direction ends 3*b* and 4*b* of the external electrodes 3 and 4 is 30 mm or less, and thus, it can be said that the second internal electrode 6 is disposed at the positions of the end parts of the external electrodes 3 and 4 in the longitudinal direction.

In the present invention, the first internal electrode 5 and the second internal electrode 6 may not face both of the pair of external electrodes 3 and 4 across flat walls 21 and 22. In the second embodiment, the first internal electrode 5 is disposed at a position not overlapping the pair of external electrodes 3 and 4 in the X direction, and both ends 5*a* and 5*b* of the first internal electrode 5 extending along the inner surfaces of the flat walls 21 and 22 do not face the pair of external electrodes 3 and 4 across the flat walls 21 and 22. Similarly, the second internal electrode 6 is disposed at a position not overlapping the pair of external electrodes 3 and 4 in the X direction, and both ends 6*a* and 6*b* of the second internal electrode 6 extending along the inner surfaces of the flat walls 21 and 22 do not face the pair of external electrodes 3 and 4 across the flat walls 21 and 22.

Third Embodiment

Figure 9A:
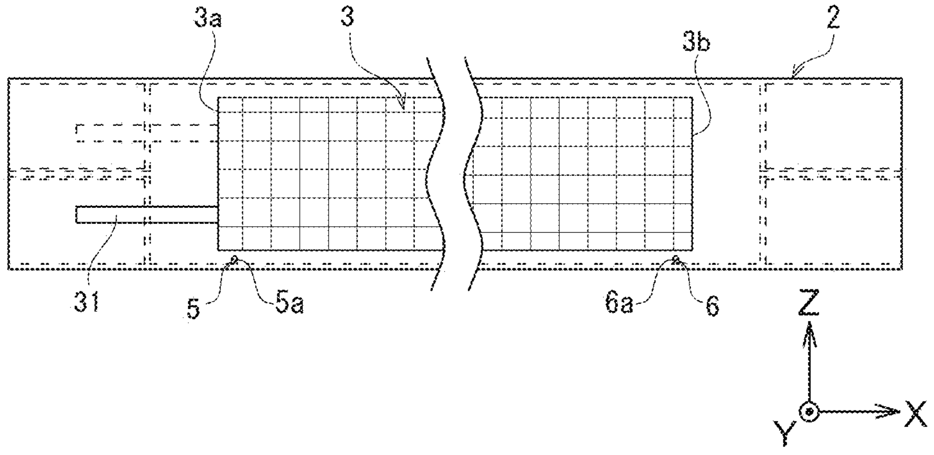
FIG. 9A is a plan view of an excimer lamp according to a third embodiment.
Figure 9B:
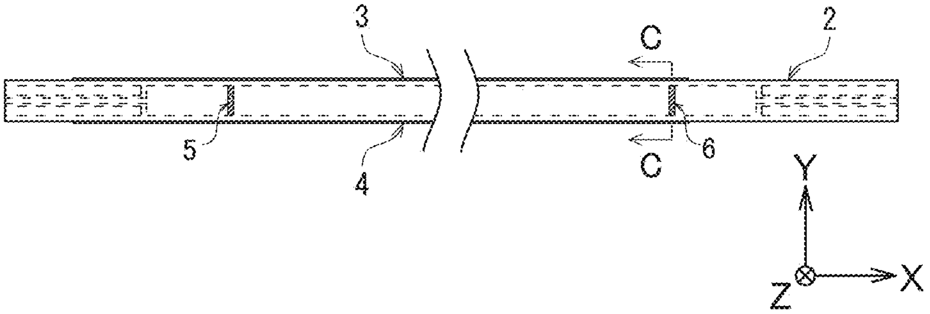
FIG. 9B is a front view of the excimer lamp according to the third embodiment.
Figure 9C:
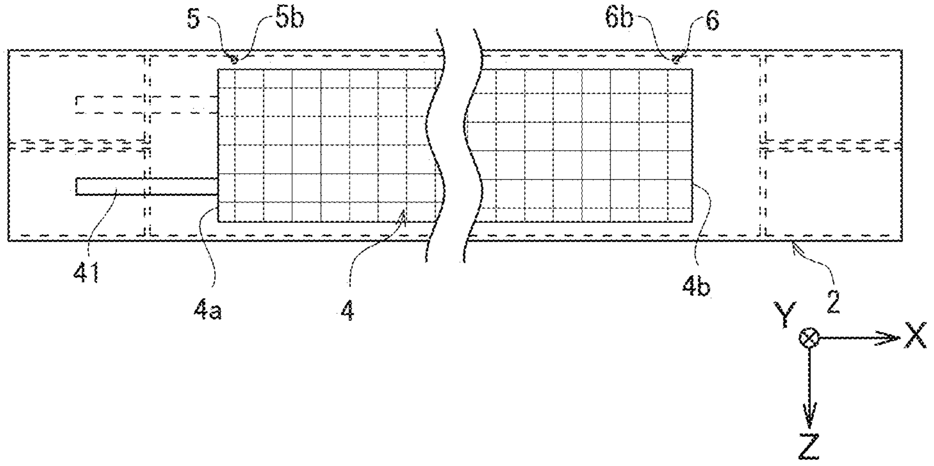
FIG. 9C is a bottom view of the excimer lamp according to the third embodiment.
Figure 10:
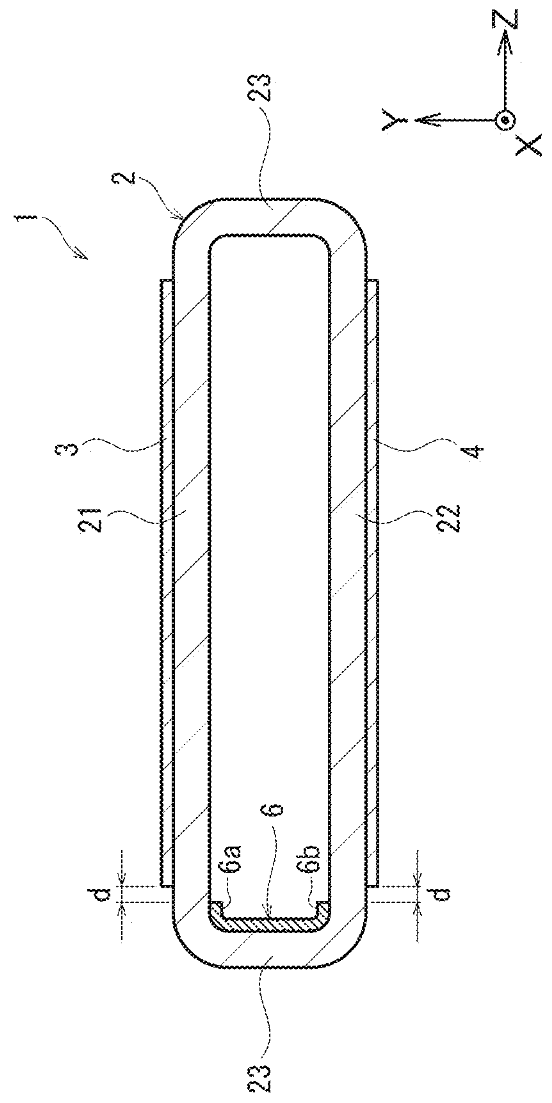
FIG. 10 is a cross-sectional view taken along line C-C of the excimer lamp illustrated in FIG. 9B.

FIGS. 9A to 9C are diagrams of an excimer lamp according to a third embodiment as viewed from three directions, in which FIG. 9A is a plan view, FIG. 9B is a front view, and FIG. 9C is a bottom view. FIG. 10 is a cross-sectional view taken along line C-C of the excimer lamp illustrated in FIG. 9B.

In the third embodiment, a first internal electrode 5 is disposed slightly inside (+X side) −X-direction ends 3*a* and 4*a* of external electrodes 3 and 4 as illustrated in FIGS. 9A to 9C. Similarly, the second internal electrode 6 is disposed slightly inside (−X side)+X-direction ends 3*b* and 4*b* of the external electrodes 3 and 4. Note that the distance in the X direction between the first internal electrode 5 and the −X-direction ends 3*a* and 4*a* of the external electrodes 3 and 4 is 30 mm or less, and thus, it can be said that the first internal electrode 5 is disposed at the positions of end parts of the external electrodes 3 and 4 in the longitudinal direction. Similarly, the distance in the X direction between the second internal electrode 6 and the +X-direction ends 3*b* and 4*b* of the external electrodes 3 and 4 is 30 mm or less, and thus, it can be said that the second internal electrode 6 is disposed at the positions of the end parts of the external electrodes 3 and 4 in the longitudinal direction.

The first internal electrode 5 and the second internal electrode 6 may not face both of the pair of external electrodes 3 and 4 across flat walls 21 and 22. In the third embodiment, the first internal electrode 5 and the second internal electrode 6 are disposed at positions overlapping the pair of external electrodes 3 and 4 in the X direction, but the first internal electrode 5 and the second internal electrode 6 do not face both of the pair of external electrodes 3 and 4 across the flat walls 21 and 22. Specifically, both ends 6*a* and 6*b* of the second internal electrode 6 extending along the inner surfaces of the flat walls 21 and 22 are shorter than those in the first embodiment illustrated in FIG. 4, and thus, do not face the pair of external electrodes 3 and 4 across the flat walls 21 and 22 as illustrated in FIG. 10. Similarly, both ends 5*a* and 5*b* of the first internal electrode 5 extending along the inner surfaces of the flat walls 21 and 22 are shorter than those in the first embodiment illustrated in FIGS. 2A to 2C, and thus, do not face the pair of external electrodes 3 and 4 across the flat walls 21 and 22 as illustrated in FIGS. 9A to 9C. A distance d (see FIG. 10) between both ends 6*a* and 6*b* of the internal electrode 6 and the external electrodes 3 and 4 is preferably 2 mm or less. Here, the distance d is the shortest distance in the Z direction between both ends 6*a* and 6*b* of the internal electrode 6 and the external electrodes 3 and 4. The same applies to the distance d between both ends 5*a* and 5*b* of the internal electrode 5 and the external electrodes 3 and 4.

When a voltage is applied to the external electrode 3 on the high-voltage side, the glass of the discharge container 2 induces electric charges, so that electric charges (potential) are generated on the inner surface of the discharge container 2. When the external electrode 3 and the internal electrodes 5 and 6 do not face each other across the flat wall 21, a large resistance is generated between a portion where a potential is generated and the internal electrodes 5 and 6. Similarly, when the external electrode 4 on the low voltage side and the internal electrodes 5 and 6 do not face each other across the flat wall 22, a large resistance is generated between a portion where a potential is generated and the internal electrodes 5 and 6. When a potential (dielectric breakdown voltage) exceeding these resistances is applied, an electric discharge occurs. The dielectric breakdown voltage increases as the length (distance d) of the portion where the external electrodes 3 and 4 and the internal electrodes 5 and 6 do not overlap increases.

Fourth Embodiment

Figure 11A:
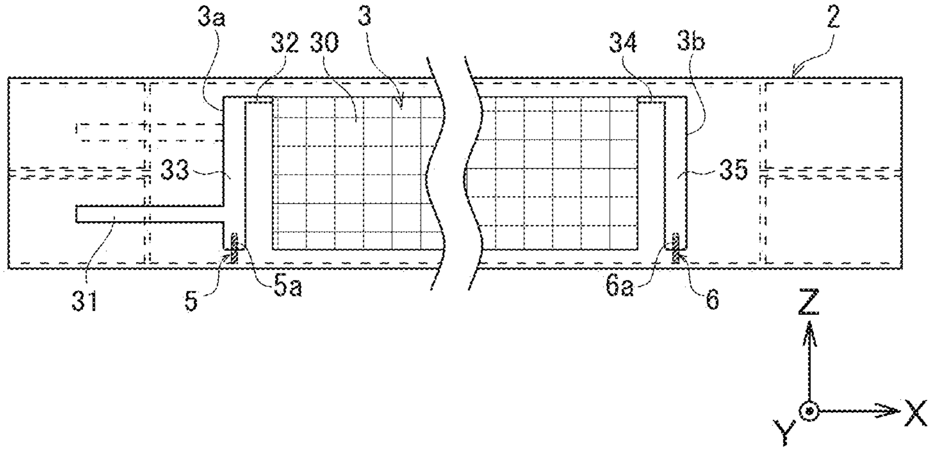
FIG. 11A is a plan view of an excimer lamp according to a fourth embodiment.
Figure 11B:
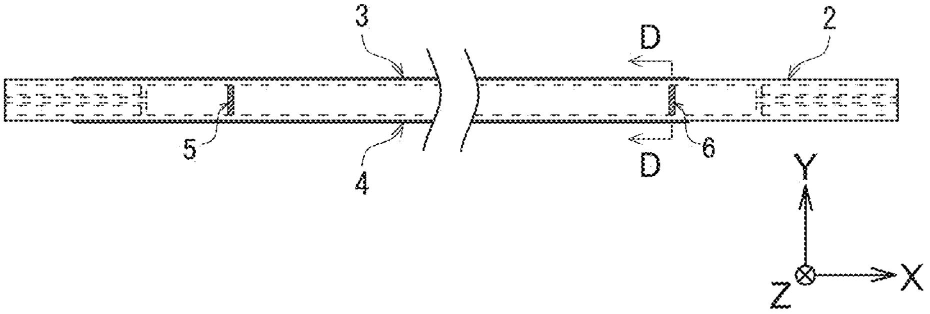
FIG. 11B is a front view of the excimer lamp according to the fourth embodiment.
Figure 11C:
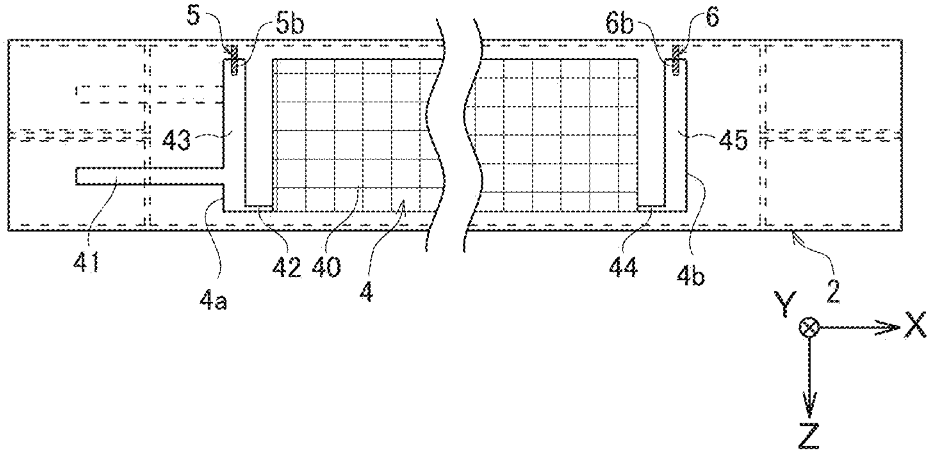
FIG. 11C is a bottom view of the excimer lamp according to the fourth embodiment.
Figure 12:
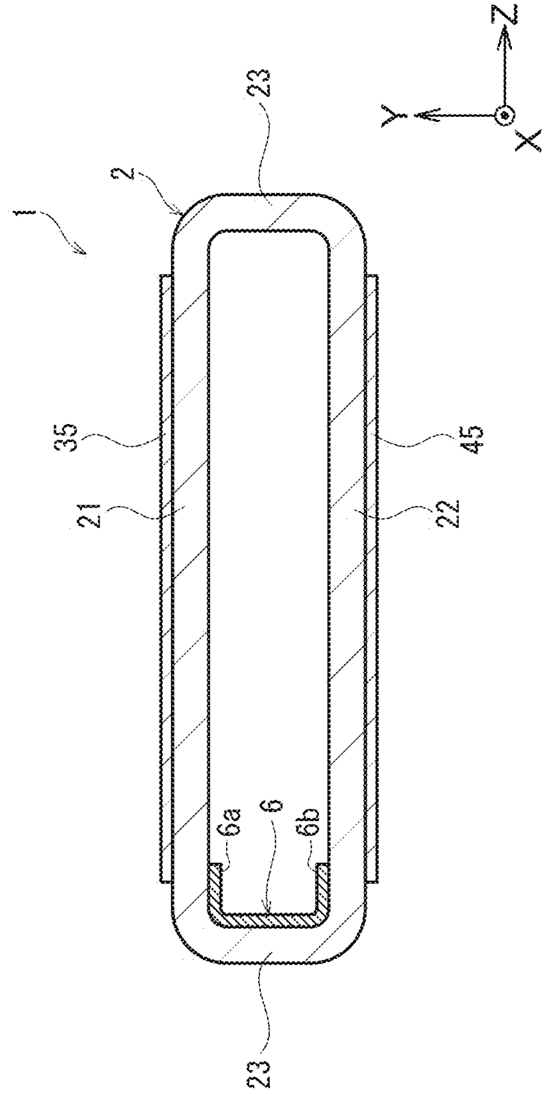
FIG. 12 is a cross-sectional view taken along line D-D of the excimer lamp illustrated in FIG. 11B.

FIGS. 11A to 11C are diagrams of an excimer lamp according to a fourth embodiment as viewed from three directions, in which FIG. 11A is a plan view, FIG. 11B is a front view, and FIG. 11C is a bottom view. FIG. 12 is a cross-sectional view taken along line D-D of the excimer lamp illustrated in FIG. 11B.

An external electrode 3 includes a body portion 30, a base portion 32 extending along the X direction from a −X-direction end of the body portion 30, a branch portion 33 extending in the −Z direction from a −X-direction end of the base portion 32, a base portion 34 extending along the X direction from a +X-direction end of the body portion 30, and a branch portion 35 extending in the −Z direction from a +X-direction end of the base portion 34. The −X-direction end 3*a* of the external electrode 3 is the −X-direction end of the branch portion 33, and the +X-direction end 3*b* of the external electrode 3 is the +X-direction end of the branch portion 35. A power supply unit 31 extending along the X direction is provided at a −X-direction end of the branch portion 33. The distance between the body portion 30 and the branch portion 33 and the distance between the body portion 30 and the branch portion 35 are both within 20 mm.

An external electrode 4 includes a body portion 40, a base portion 42 extending along the X direction from a −X-direction end of the body portion 40, a branch portion 43 extending in the −Z direction from a −X-direction end of the base portion 42, a base portion 44 extending along the X direction from a +X-direction end of the body portion 40, and a branch portion 45 extending in the −Z direction from a +X-direction end of the base portion 44. The −X-direction end 4*a* of the external electrode 4 is the −X-direction end of the branch portion 43, and the +X-direction end 4*b* of the external electrode 4 is the +X-direction end of the branch portion 45. A power supply unit 41 extending along the X direction is provided at a −X-direction end of the branch portion 43. The distance between the body portion 40 and the branch portion 43 and the distance between the body portion 40 and the branch portion 45 are both within 20 mm.

In the fourth embodiment, a first internal electrode 5 is disposed slightly inside (+X side) the −X-direction ends 3*a* and 4*a* of the external electrodes 3 and 4 as illustrated in FIGS. 11A to 11C. Similarly, a second internal electrode 6 is disposed slightly inside (−X side) the +X-direction ends 3*b* and 4*b* of the external electrodes 3 and 4. Note that the distance in the X direction between the first internal electrode 5 and the −X-direction ends 3*a* and 4*a* of the external electrodes 3 and 4 is 30 mm or less, and thus, it can be said that the first internal electrode 5 is disposed at the positions of end parts of the external electrodes 3 and 4 in the longitudinal direction. Similarly, the distance in the X direction between the second internal electrode 6 and the +X-direction ends 3*b* and 4*b* of the external electrodes 3 and 4 is 30 mm or less, and thus, it can be said that the second internal electrode 6 is disposed at the positions of the end parts of the external electrodes 3 and 4 in the longitudinal direction.

In the fourth embodiment, both ends 6*a* and 6*b* of the second internal electrode 6 extending along the inner surfaces of flat walls 21 and 22 face the pair of external electrodes 3 and 4, specifically the branch portions 35 and 45 of the pair of external electrodes 3 and 4, across the flat walls 21 and 22 as illustrated in FIG. 12. Similarly, both ends 5*a* and 5*b* of the first internal electrode 5 extending along the inner surfaces of the flat walls 21 and 22 face the pair of external electrodes 3 and 4, specifically the branch portions 33 and 43 of the pair of external electrodes 3 and 4, across the flat walls 21 and 22 as illustrated in FIGS. 11A to 11C.

Fifth Embodiment

Figure 13A:
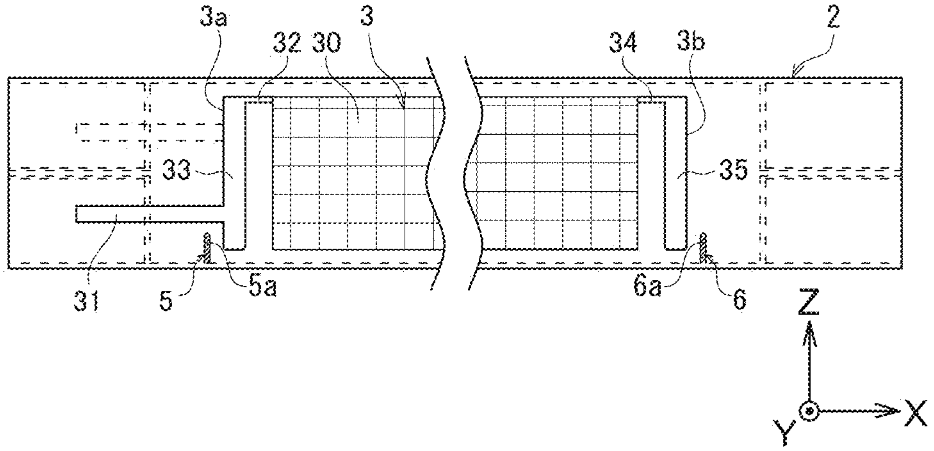
FIG. 13A is a plan view of an excimer lamp according to a fifth embodiment.
Figure 13B:
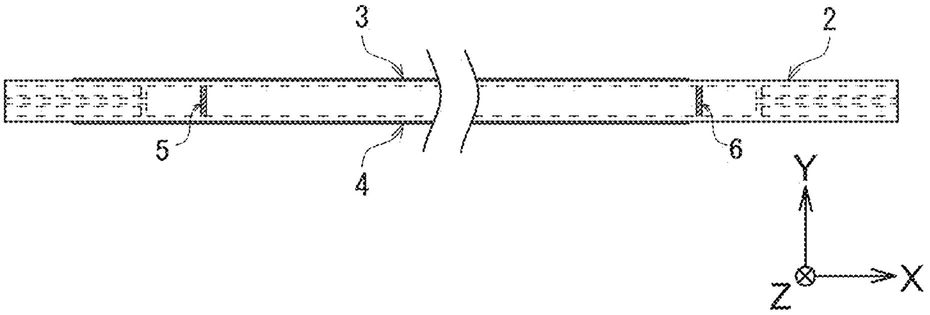
FIG. 13B is a front view of the excimer lamp according to the fifth embodiment.
Figure 13C:
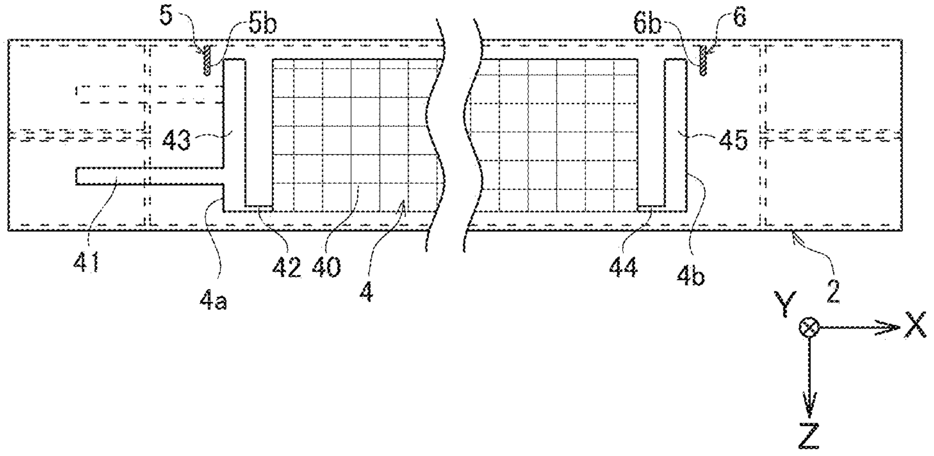
FIG. 13C is a bottom view of the excimer lamp according to the fifth embodiment.

FIGS. 13A to 13C are diagrams of an excimer lamp according to a fifth embodiment as viewed from three directions, in which FIG. 13A is a plan view, FIG. 13B is a front view, and FIG. 13C is a bottom view.

In the fifth embodiment, a first internal electrode 5 is disposed slightly outside (−X side) −X-direction ends 3*a* and 4*a* of external electrodes 3 and 4 as illustrated in FIGS. 13A to 13C. Similarly, a second internal electrode 6 is disposed slightly outside (+X side)+X-direction ends 3*b* and 4*b* of the external electrodes 3 and 4. Note that the distance in the X direction between the first internal electrode 5 and the −X-direction ends 3*a* and 4*a* of the external electrodes 3 and 4 is 30 mm or less, and thus, it can be said that the first internal electrode 5 is disposed at the positions of end parts of the external electrodes 3 and 4 in the longitudinal direction. Similarly, the distance in the X direction between the second internal electrode 6 and the +X-direction ends 3*b* and 4*b* of the external electrodes 3 and 4 is 30 mm or less, and thus, it can be said that the second internal electrode 6 is disposed at the positions of the end parts of the external electrodes 3 and 4 in the longitudinal direction.

In the fifth embodiment, the first internal electrode 5 is disposed at a position not overlapping the pair of external electrodes 3 and 4 in the X direction, and the first internal electrode 5 does not face both of the pair of external electrodes 3 and 4 across the flat walls 21 and 22. Similarly, the second internal electrode 6 is disposed at a position not overlapping the pair of external electrodes 3 and 4 in the X direction, and the second internal electrode 6 does not face both of the pair of external electrodes 3 and 4 across the flat walls 21 and 22.

Sixth Embodiment

Figure 14A:
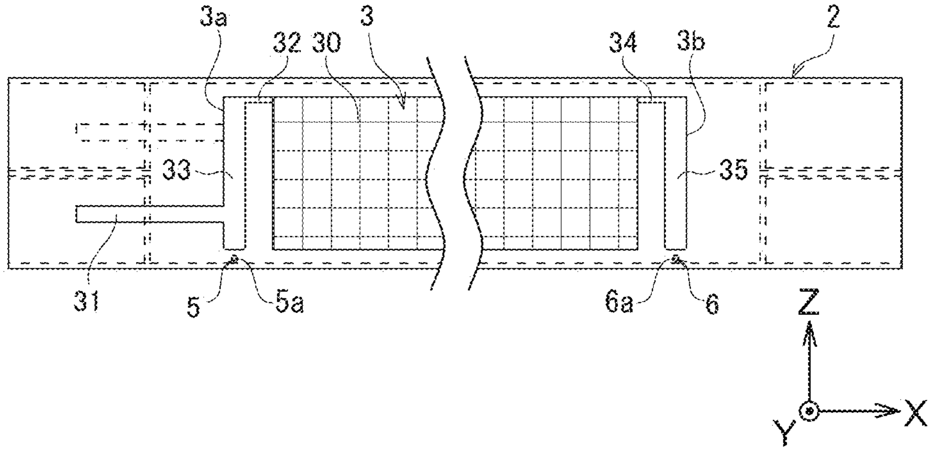
FIG. 14A is a plan view of an excimer lamp according to a sixth embodiment.
Figure 14B:
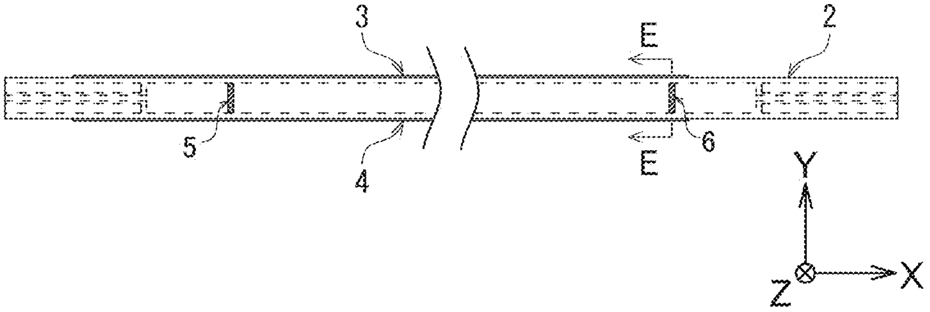
FIG. 14B is a front view of the excimer lamp according to the sixth embodiment.
Figure 14C:
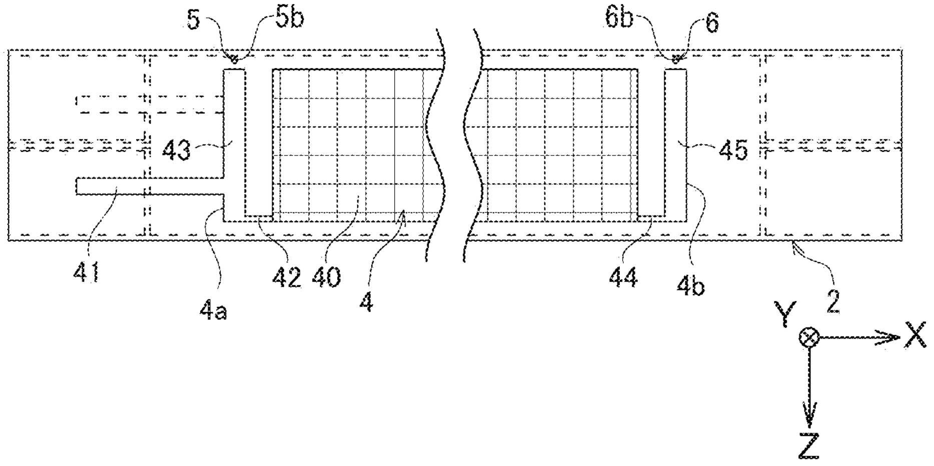
FIG. 14C is a bottom view of the excimer lamp according to the sixth embodiment.
Figure 15:
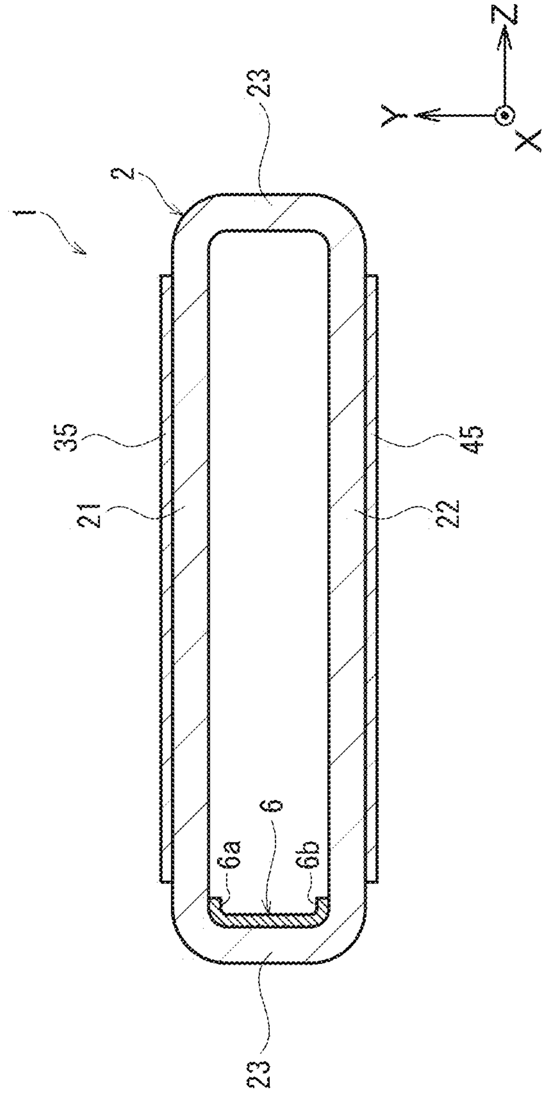
FIG. 15 is a cross-sectional view taken along line E-E of the excimer lamp illustrated in FIG. 14B.

FIGS. 14A to 14C are diagrams of an excimer lamp according to a sixth embodiment as viewed from three directions, in which FIG. 14A is a plan view, FIG. 14B is a front view, and FIG. 14C is a bottom view. FIG. 15 is a cross-sectional view taken along line E-E of the excimer lamp illustrated in FIG. 14B.

In the sixth embodiment, a first internal electrode 5 is disposed slightly inside (+X side) −X-direction ends 3*a* and 4*a* of external electrodes 3 and 4 as illustrated in FIGS. 14A to 14C. Similarly, a second internal electrode 6 is disposed slightly inside (−X side)+X-direction ends 3*b* and 4*b* of the external electrodes 3 and 4. Note that the distance in the X direction between the first internal electrode 5 and the −X-direction ends 3*a* and 4*a* of the external electrodes 3 and 4 is 30 mm or less, and thus, it can be said that the first internal electrode 5 is disposed at the positions of end parts of the external electrodes 3 and 4 in the longitudinal direction. Similarly, the distance in the X direction between the second internal electrode 6 and the +X-direction ends 3*b* and 4*b* of the external electrodes 3 and 4 is 30 mm or less, and thus, it can be said that the second internal electrode 6 is disposed at the positions of the end parts of the external electrodes 3 and 4 in the longitudinal direction.

In the sixth embodiment, the first internal electrode 5 and the second internal electrode 6 are disposed at positions overlapping the pair of external electrodes 3 and 4 in the X direction, but the first internal electrode 5 and the second internal electrode 6 do not face both of the pair of external electrodes 3 and 4 across flat walls 21 and 22. Specifically, both ends 6*a* and 6*b* of the second internal electrode 6 extending along the inner surfaces of the flat walls 21 and 22 are shorter than those in the fourth embodiment illustrated in FIG. 12, and thus, do not face the pair of external electrodes 3 and 4 across the flat walls 21 and 22 as illustrated in FIG. 15. Similarly, both ends 5*a* and 5*b* of the first internal electrode 5 extending along the inner surfaces of the flat walls 21 and 22 are shorter than those in the fourth embodiment illustrated in FIGS. 11A to 11C, and thus, do not face the pair of external electrodes 3 and 4 across the flat walls 21 and 22 as illustrated in FIGS. 14A to 14C.

While the embodiments of the present invention have been described above with reference to the drawings, it should be construed that specific configurations are not limited to these embodiments. The scope of the present invention is defined not only by the description of the above embodiments but also by the claims, and includes meanings equivalent to the claims and all modifications within the scope.

The structure adopted in each of the above embodiments can be adopted in any other embodiment. The specific configuration of each component is not limited only to that in the above-described embodiments, and various modifications are possible without departing from the spirit of the present invention.

(1) In the excimer lamp 1 according to the above embodiments, the first internal electrode 5 and the second internal electrode 6 are respectively disposed at the positions of the end parts of the external electrodes 3 and 4 in the longitudinal direction, but not limited thereto. The first internal electrode 5 and the second internal electrode 6 are only required to be disposed respectively at any position between the end parts and the central parts of the external electrodes 3 and 4 in the longitudinal direction.

Figure 16:
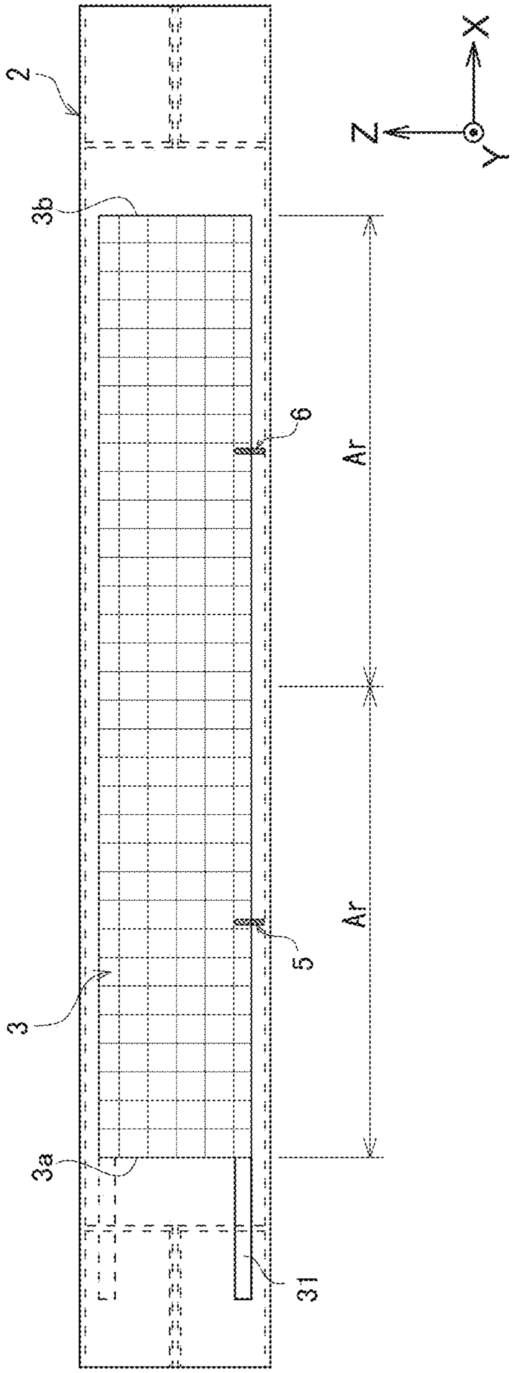
FIG. 16 is a plan view of an excimer lamp according to another embodiment.

In addition, it is preferable that n internal electrodes including the first internal electrode 5 and the second internal electrode 6 are each disposed at a central position of a region obtained by dividing the external electrodes 3 and 4 into n equal parts in the longitudinal direction. FIG. 16 illustrates an example in which the first internal electrode 5 and the second internal electrode 6 are each disposed at a central position of a region Ar obtained by dividing the external electrodes 3 and 4 into two equal parts in the longitudinal direction.

Figure 17:
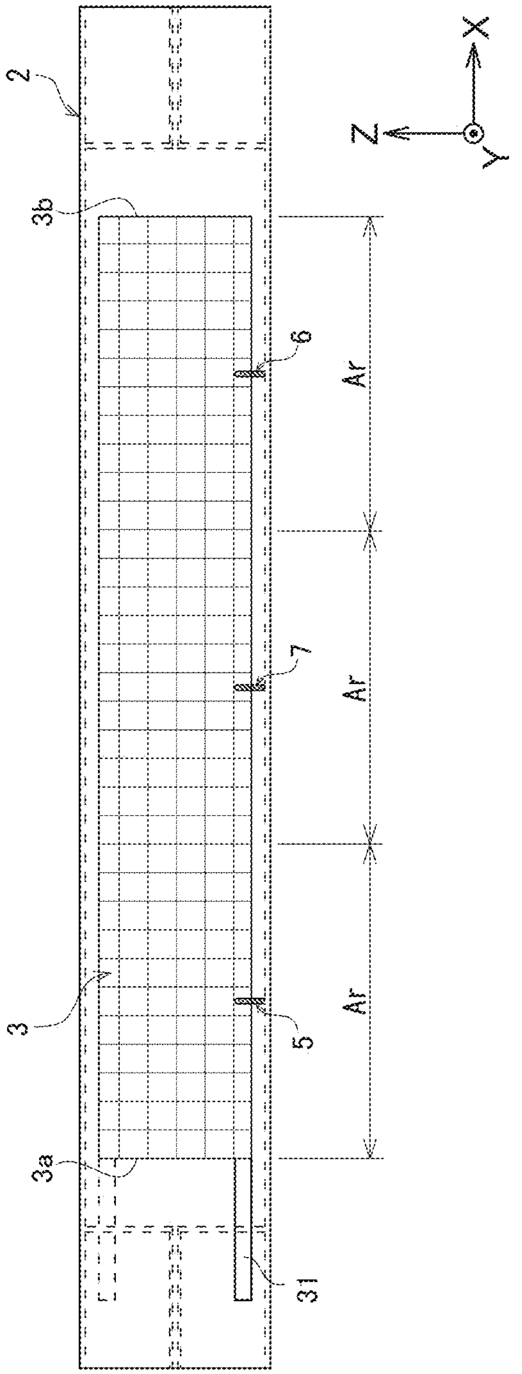
FIG. 17 is a plan view of an excimer lamp according to another embodiment.

In addition, the excimer lamp 1 may further include, inside the discharge container 2, a third internal electrode 7 disposed at a position between the first internal electrode 5 and the second internal electrode 6 in the longitudinal direction so as to extend toward the inner surfaces of the pair of flat walls 21 and 22. In this configuration, it is preferable that, as illustrated in FIG. 17, the first internal electrode 5, the second internal electrode 6, and the third internal electrode 7 are each disposed at a central position of a region Ar obtained by dividing the external electrodes 3 and 4 into three equal parts in the longitudinal direction.

Figure 18:
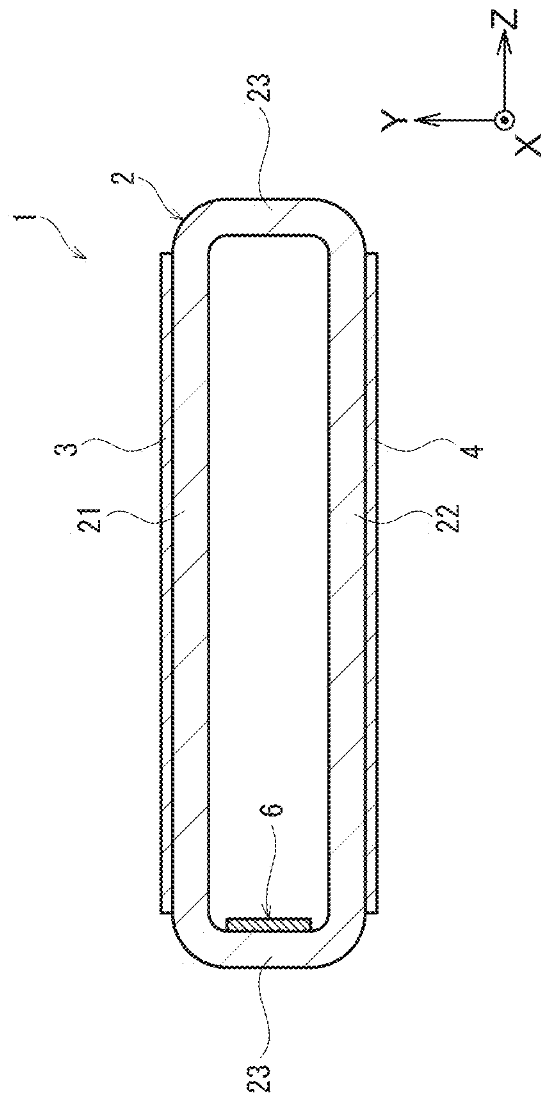
FIG. 18 is a cross-sectional view of an excimer lamp according to another embodiment.

(2) In the excimer lamp 1 according to the above embodiments, the first internal electrode 5 and the second internal electrode 6 are disposed inside the discharge container 2 so as to connect the inner surfaces of the pair of flat walls 21 and 22, but not limited thereto. When the external electrodes 3 and 4 are large in width in the Z direction as illustrated in FIG. 18, the second internal electrode 6 only needs to extend toward the inner surfaces of the pair of flat walls 21 and 22 inside the discharge container 2, and is not necessarily connected to the inner surfaces of the pair of flat walls 21 and 22. The shortest distance between both ends of the second internal electrode 6 and the external electrodes 3 and 4 is preferably 2 mm or less. The same applies to the first internal electrode 5.

(3) In the excimer lamp 1 according to the above embodiments, the first internal electrode 5 and the second internal electrode 6 are disposed so as to connect the inner surfaces of the pair of flat walls 21 and 22 along the side walls 23 of the discharge container 2, but not limited thereto. For example, the first internal electrode 5 and the second internal electrode 6 may have a structure in which a glass plate is held between the pair of flat walls 21 and 22 and a metal wire is wound around the glass plate.

DESCRIPTION OF REFERENCE SIGNS

1 Excimer lamp
2 Discharge container
3 External electrode
3*a* −X-direction end
3*b* +X-direction end
4 External electrode
4*a* −X-direction end
4*b* +X-direction end
5 First internal electrode
6 Second internal electrode
7 Third internal electrode
9 Lighting device
21 Flat wall
22 Flat wall
23 Side wall
30 Body portion
31 Power supply unit
32 Base portion
33 Branch portion
34 Base portion
35 Branch portion
40 Body portion
41 Power supply unit
42 Base portion
43 Branch portion
44 Base portion
45 Branch portion
Ar Region obtained by division into n

The invention claimed is:

1. An excimer lamp comprising:

a discharge container having a substantially quadrangular shape with a cross section, the discharge container having a pair of flat walls extending in a longitudinal direction and a pair of side walls connecting the flat walls;

a pair of external electrodes facing each other disposed on outer surfaces of the pair of flat walls, respectively;

a first internal electrode disposed inside the discharge container so as to extend toward inner surfaces of the pair of flat walls; and a second internal electrode disposed inside the discharge container at a position spaced apart from the first internal electrode in the longitudinal direction so as to extend toward the inner surfaces of the pair of flat walls, wherein the first internal electrode and the second internal electrode are respectively disposed at positions between end parts and central parts of the external electrodes in the longitudinal direction.

2. The excimer lamp according to claim 1, wherein the first internal electrode is disposed so as to connect the inner surfaces of the pair of flat walls, and the second internal electrode is disposed so as to connect the inner surfaces of the pair of flat walls.

3. The excimer lamp according to claim 1, wherein the first internal electrode and the second internal electrode are disposed along inner surfaces of the side walls.

4. The excimer lamp according to claim 1, wherein at least a part of the first internal electrode or the second internal electrode faces at least one of the pair of external electrodes across the flat walls.

5. The excimer lamp according to claim 1, wherein the first internal electrode and the second internal electrode do not face both of the pair of external electrodes across the flat walls.

6. The excimer lamp according to claim 1, further comprising a third internal electrode inside the discharge container, the third internal electrode being disposed at a position between the first internal electrode and the second internal electrode in the longitudinal direction so as to extend toward the inner surfaces of the pair of flat walls.

7. The excimer lamp according to claim 6, wherein the third internal electrode is disposed to connect the inner surfaces of the pair of flat walls.

8. The excimer lamp according to claim 1, wherein the first internal electrode and the second internal electrode are respectively disposed at positions of end parts of the external electrodes in the longitudinal direction.

9. The excimer lamp according to claim 1, wherein n internal electrodes including the first internal electrode and the second internal electrode are each disposed at a central position of a region obtained by dividing the external electrodes into n equal parts in the longitudinal direction.

10. The excimer lamp according to claim 1, wherein the discharge container has a length of 600 mm or more in the longitudinal direction of the discharge container.

11. An excimer lamp device comprising:

the excimer lamp according to claim 1; and a lighting device for lighting the excimer lamp, wherein the lighting device includes a dimming means for dimming the excimer lamp.

12. The excimer lamp device according to claim 11, wherein the discharge container of the excimer lamp has a length of 600 mm or more in the longitudinal direction of the discharge container.

13. The excimer lamp device according to claim 11, wherein the dimming means includes a duty control unit that changes a time ratio between an On-time and an Off-time of the excimer lamp.

14. The excimer lamp device according to claim 11, wherein the dimming means includes a frequency control unit that changes a lighting frequency of the excimer lamp.

15. The excimer lamp device according to claim 11, wherein the dimming means includes a voltage control unit that changes a lighting voltage of the excimer lamp.

* * * * *